US008758906B2

(12) United States Patent
Maeda et al.

(10) Patent No.: US 8,758,906 B2
(45) Date of Patent: Jun. 24, 2014

(54) SOFT MAGNETIC MATERIAL, POWDER MAGNETIC CORE AND PROCESS FOR PRODUCING THE SAME

(75) Inventors: Toru Maeda, Itami (JP); Naoto Igarashi, Itami (JP); Haruhisa Toyoda, Itami (JP); Kazuhiro Hirose, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 352 days.

(21) Appl. No.: 10/562,798

(22) PCT Filed: Feb. 22, 2005

(86) PCT No.: PCT/JP2005/002788

§ 371 (c)(1),
(2), (4) Date: Dec. 29, 2005

(87) PCT Pub. No.: WO2005/083725

PCT Pub. Date: Sep. 9, 2005

(65) Prior Publication Data

US 2006/0159960 A1 Jul. 20, 2006

(30) Foreign Application Priority Data

Feb. 26, 2004 (JP) ................................ 2004-051234

(51) Int. Cl.
*B32B 15/00* (2006.01)

(52) U.S. Cl.
USPC ......................... 428/692.1; 427/180; 427/370

(58) Field of Classification Search
USPC .......................................................... 428/692
See application file for complete search history.

(56) References Cited

U.S. PATENT DOCUMENTS 4,390,361 A * 6/1983 Sueyoshi et al. .............. 428/570
4,919,734 A * 4/1990 Ochiai et al. .................. 148/306

(Continued)

FOREIGN PATENT DOCUMENTS

EP 1 263 004 A2 12/2002
JP 54-797 A 1/1979

(Continued)

OTHER PUBLICATIONS

S. Watson et al., Synthesis of a novel magnetic photocatalyst by direct deposition of nanosized TiO2 crystals onto a magnetic Core, Jan. 9, 2002, Journal of photchemistry and photbiology, 148 (2002) 303-313.*

(Continued)

*Primary Examiner* — Holly Rickman
*Assistant Examiner* — Lisa Chau
(74) *Attorney, Agent, or Firm* — McDermott Will & Emery LLP

(57) ABSTRACT

A soft magnetic material includes a plurality of composite magnetic particles. Each of the plurality of composite magnetic particles has: a metal magnetic particle including iron; a lower film surrounding the surface of the metal magnetic particle and including a nonferrous metal; and an insulating upper film surrounding the surface of the lower film and including at least one of oxygen and carbon. The nonferrous metal has an affinity with the at least one of oxygen and carbon included in the upper film that is larger than such affinity of iron; or the nonferrous metal has a diffusion coefficient with respect to the at least one of oxygen and carbon included in the upper film that is smaller than such diffusion coefficient of iron. This configuration provides desirable magnetic properties.

6 Claims, 2 Drawing Sheets

(56) References Cited

U.S. PATENT DOCUMENTS

| | | | | |
|---|---|---|---|---|
| 5,935,722 | A * | 8/1999 | Moorhead et al. | 428/846.2 |
| 6,063,209 | A * | 5/2000 | Matsutani et al. | 148/300 |
| 6,149,704 | A * | 11/2000 | Moro et al. | 75/230 |
| 6,251,196 | B1 * | 6/2001 | Nishiuchi et al. | 148/277 |
| 6,444,328 | B1 * | 9/2002 | Nishiuchi et al. | 428/469 |
| 6,617,044 | B2 * | 9/2003 | Nishiuchi et al. | 428/553 |
| 7,285,329 | B2 * | 10/2007 | Kaneko et al. | 428/403 |
| 2001/0030590 | A1 | 10/2001 | Nishiuchi et al. | |
| 2003/0077448 | A1 | 4/2003 | Ueta et al. | |
| 2004/0126609 | A1 * | 7/2004 | Ueta et al. | 428/570 |
| 2005/0181202 | A1 * | 8/2005 | Kaneko et al. | 428/336 |

FOREIGN PATENT DOCUMENTS

| | | | | | |
|---|---|---|---|---|---|
| JP | 05140620 | A | * | 6/1993 | B22F 9/22 |
| JP | 6-306405 | A | | 11/1994 | |
| JP | 7-179982 | A | | 7/1995 | |
| JP | 07179982 | A | * | 7/1995 | C22C 33/02 |
| JP | 7-245209 | A | | 9/1995 | |
| JP | 2002-184615 | A | | 6/2002 | |
| JP | 2002-246219 | A | | 8/2002 | |
| JP | 2003-272910 | A | | 9/2003 | |
| JP | 2003-272911 | A | | 9/2003 | |
| JP | 2003-303711 | A | | 10/2003 | |
| JP | 2004-197115 | A | | 7/2004 | |
| JP | 2005-85967 | A | | 3/2005 | |
| JP | 2005085967 | A | * | 3/2005 | H01F 1/33 |
| JP | 2005223259 | A | * | 8/2005 | H01F 1/24 |

OTHER PUBLICATIONS

Watson et al. "Synthesis of a novel magnetic photocatalyst by direct deposition of nanosized TiO2 crystals onto a magnetic core", Journal of Photochemistry and Photobiology A: Chemistry, vol. 148, 303-313, May 31, 2005.*

Chinese Office Action, with written opinion and English translation issued in Chinese Patent Application No. CN 2005-80003072.0 dated on April 25, 2008.

Watson et al "Synthesis of a Novel Photocatalyst by Direct Depositions of Nanosized TiO Crystals onto a Magnetic Core" Journal of Photo Chemistry and Photobiology A: Chemestry pp. 303-313 vol. 148 Elsevier Jan. 2002.

Watson et al "Synthesis of a Novel Magnetic Photocatalyst by Direct Depositions of Nanosized $TiO_2$ Crystals onto a Magnetic Core" Journal of Photo Chemistry and Photobiology A: Chemestry pp. 303-313 vol. 148 Elsevier Jan. 2002.

European Search Report issued in European Patent Application No. 05710514.0-1215, mailed Feb. 17, 2011.

Japanese Notice of Grounds of Rejection, w/ English translation thereof, issued in Japanese Patent Application No. JP 2006-519360 dated Mar. 9, 2010.

* cited by examiner

SOFT MAGNETIC MATERIAL, POWDER MAGNETIC CORE AND PROCESS FOR PRODUCING THE SAME

RELATED APPLICATION

This application is the U.S. National Phase under 35 U.S.C. §371 of International Application No. PCT/JP2005/002788, filed on Feb. 22, 2005, which in turn claims the benefit of Japanese Application No. 2004-051234, filed on Feb. 26, 2004, the disclosure of which Applications are incorporated by reference herein.

TECHNICAL FIELD

The present invention generally relates to a soft magnetic material and a dust core and a method of manufacturing the same, and more particularly, to a soft magnetic material and a dust core including metal magnetic particles covered with an insulating film and a method of manufacturing the same.

BACKGROUND ART

Conventionally, attempts have been made to provide electric and electronic components such as motor and transformer cores having higher densities and smaller sizes to meet the demand for more precise control using small electric power, which has lead to development of soft magnetic materials used in fabricating such electric and electronic components which provide improved magnetic properties particularly in the middle to high frequency range.

In conjunction with such soft magnetic materials, Japanese Patent Laying-Open No. 2002-246219, for example, discloses a dust core in which magnetic properties can be maintained during use in high temperatures and a method of manufacturing such a core (Patent Document 1). According to the method disclosed in Patent Document 1, an atomized iron powder covered with a phosphate film is first mixed with a predetermined amount of polyphenylene sulfide (PPS resin) and then undergoes compression molding. The resulting molding is heated in air at a temperature of 320° C. for one hour and then heated at a temperature of 240° C. for another hour. It is then cooled to fabricate a dust core.

Patent Document 1: Japanese Patent Laying-Open No. 2002-246219

DISCLOSURE OF THE INVENTION

Problems to be Solved by the Invention

The dust core thus fabricated may include numerous distortions (dislocations, defects) in its interior, which will prevent the movement of domain walls (change in magnetic flux), resulting in a decrease in magnetic permeability of the dust core. The dust core disclosed in Patent Document 1 experiences heat treatment twice as a molding and still fails to properly eliminate internal distortion. Consequently, the effective permeability of the resulting dust core, which may vary depending on the frequency and the content of the PPS resin, always remains at low values of 400 or below.

It may also be contemplated to perform the heat treatment on the molding at higher temperatures in order to reduce distortion within the dust core to an acceptable level. However, the phosphate compound covering the atomized iron powder has a low heat resistance and thus degenerates during heat treatment at high temperature. This results in a phosphate covered atomized iron powder with increased eddy current loss between particles, which may reduce the permeability of the dust core.

An object of the present invention, therefore, is to solve the above problems by providing a soft magnetic material and a dust core that provides desirable magnetic properties and a method of manufacturing the same.

Means for Solving the Problems

A soft magnetic material according to an aspect of the present invention includes a plurality of composite magnetic particles. Each of the plurality of composite magnetic particles has: a metal magnetic particle including iron; a lower film surrounding the surface of the metal magnetic particle and including a nonferrous metal; and an insulating upper film surrounding the surface of the lower film and including at least one of oxygen and carbon. The nonferrous metal has an affinity with the at least one of oxygen and carbon included in the upper film that is greater than such affinity of iron.

In a soft magnetic material with this configuration, the lower film provided between the metal magnetic particle and the insulating upper film is capable of preventing oxygen or carbon in the upper film from diffusing into the metal magnetic particle during the heat treatment of the soft magnetic material since the lower film includes a nonferrous metal with an affinity with oxygen or carbon larger than that of iron in the metal magnetic particle, which promotes the reaction of oxygen and carbon with the nonferrous metal and captures them in the lower film, thereby preventing oxygen and carbon from infiltrating into the metal magnetic particle (gettering effect). This minimizes the increase in the impurity concentration within the metal magnetic particle and thereby prevents degeneration of the metal magnetic particle in its magnetic properties. Preventing oxygen and carbon from diffusing into the metal magnetic particle also minimizes the decrease in the oxygen and carbon contents in the upper film, thus preventing decomposition or degradation of the upper film which would result in lower insulation in the upper film.

A soft magnetic material according to another aspect of the present invention includes a plurality of composite magnetic particles. Each of the plurality of composite magnetic particles has: a metal magnetic particle including iron; a lower film surrounding the surface of the metal magnetic particle and including a nonferrous metal; and an insulating upper film surrounding the surface of the lower film and including at least one of oxygen and carbon. The nonferrous metal has a diffusion coefficient with respect to the at least one of oxygen and carbon included in the upper film that is smaller than such diffusion coefficient of iron.

In a soft magnetic material with this configuration, the lower film provided between the insulating upper film and the metal magnetic particle is capable of reducing the diffusion of oxygen or carbon in the upper film into the metal magnetic particle during heat treatment of the soft magnetic material, since the lower film includes a nonferrous metal with a diffusion coefficient with respect to oxygen or carbon smaller than that of iron included in the metal magnetic particle, such that the diffusion rate of oxygen and carbon toward the metal magnetic particle from the upper film is reduced at the lower film, which prevents oxygen and carbon from infiltrating into the metal magnetic particle (barrier effect), which minimizes the increase in impurity concentration in the metal magnetic particle and thus prevents deterioration in magnetic properties of the metal magnetic particle. Preventing oxygen and carbon from diffusing into the metal magnetic particle also minimizes the decrease in the oxygen and carbon content in the upper film, thus preventing decomposition or degradation of the upper film, which would result in lower insulation in the upper film.

Thus, these inventions allow performing a heat treatment at high temperatures on a soft magnetic material without causing degeneration of the metal magnetic particle and the insulating upper film.

Preferably, the nonferrous metal includes at least one selected from the group consisting of aluminum (Al), chromium (Cr), silicon (Si), titanium (Ti), vanadium (V) and nickel (Ni). In a soft magnetic material with this configuration, these materials either have large affinity with oxygen or carbon, or have small diffusion coefficient with respect to oxygen or carbon compared with iron. Consequently, the above advantages may be produced by at least one of the gettering effect and the barrier effect from the lower film.

In addition, reaction between these materials and oxygen or carbon may result in increased electric resistance of the lower film, where the lower film may cooperate with the upper film to function as an insulator. Further, these materials do not impair soft magnetic properties of the metal magnetic particle when they form a solid solution with iron included in the metal magnetic particle, preventing deterioration in magnetic properties of the soft magnetic material.

Preferably, the lower film has an average thickness of not less than 50 nm and not more than 1 μm. In a soft magnetic material with this configuration, an average thickness of the lower film not less than 50 nm ensures the gettering or barrier effect from the lower film. Also, since the average thickness of the lower film lies at not more than 1 μm, a molding fabricated using a soft magnetic material of the present invention has no metal magnetic particle too much spaced apart from another. This prevents diamagnetism between metal magnetic particles (energy loss due to magnetic poles in metal magnetic particles), thereby minimizing increased hysteresis loss due to diamagnetism. In addition, the nonmagnetic layer's proportion in volume within the soft magnetic material can be minimized, minimizing the decrease in saturation flux density.

Preferably, the upper film includes at least one selected from the group consisting of a phosphorus compound, a silicon compound, an aluminum compound, a zirconium compound and a titanium compound. In a soft magnetic material with this configuration, these materials have good insulation which reduces the eddy current between metal magnetic particles still more effectively.

Preferably, the upper film has an average thickness of not less than 10 nm and not more than 1 μm. In a soft magnetic material with this configuration, an average thickness of the upper film not less than 10 nm minimizes tunneling current in the film, thereby minimizing increased eddy current loss due to tunneling current. Further, since the average thickness of the upper layer lies at not more than 1 μm, a molding fabricated using a soft magnetic material of the present invention has no metal magnetic particle too much spaced apart from another. This prevents diamagnetism between metal magnetic particles and minimizes increased hysteresis loss due to diamagnetism. Furthermore, the nonmagnetic layer's proportion in volume within the soft magnetic material can be minimized, minimizing the decrease in saturation flux density.

A dust core according to the present invention is fabricated using any of the soft magnetic materials described above. In a dust core with this configuration, heat treatment at high temperatures achieves satisfactory reduction in distortion within the dust core, thereby providing improved magnetic properties in that the hysteresis loss is reduced. At the same time, despite the heat treatment at high temperatures, the insulating upper film protected by virtue of the lower film may provide improved magnetic properties in that the eddy current loss is reduced.

Preferably, the dust core further includes an organic matter disposed between the plurality of composite magnetic particles to join the plurality of composite magnetic particles together and including at least one selected from the group consisting of a polyethylene resin, a silicone resin, a polyamide resin, a polyimide resin, a polyamide imide resin, an epoxy resin, a phenolic resin, an acrylic resin and a polytetrafluorothylene. In a dust core with this configuration, these organic matters firmly join the plurality of composite magnetic particles together and function as a lubricant during the pressure-forming of the soft magnetic material, thereby preventing the composite magnetic particles from rubbing against each other which would otherwise damage the upper film. Thus, the strength of the dust core may be improved and the eddy current loss may be reduced. Further, since the metal magnetic particle is covered with the lower film, oxygen or carbon included in these organic matters can be prevented from diffusing into the metal magnetic particle.

A method of manufacturing the dust core according to the present invention includes the steps of: by pressure-forming the plurality of composite magnetic particles, forming a molding; and heat-treating the molding at a temperature of not less than 500° C. In a method of manufacturing a dust core with this configuration, a temperature for the heat treatment performed on the molding not less than 500° C. can reduce distortion within the dust core to a satisfactory degree. Further, despite the fact that the molding may be exposed to such high temperatures, the lower film may act to prevent degeneration of the metal magnetic particle and the insulating upper film.

Effects of the Invention

As described above, the present invention may provide a soft magnetic material and a dust core providing desirable magnetic properties and a method of manufacturing the same.

DESCRIPTION OF THE REFERENCE CHARACTERS

10 metal magnetic particle, 20 lower film, 30 upper film, 40 composite magnetic particle, 50 organic matter

BEST MODES FOR CARRYING OUT THE INVENTION

Embodiments of the present invention will now be described with reference to the drawings.

Figure 1:
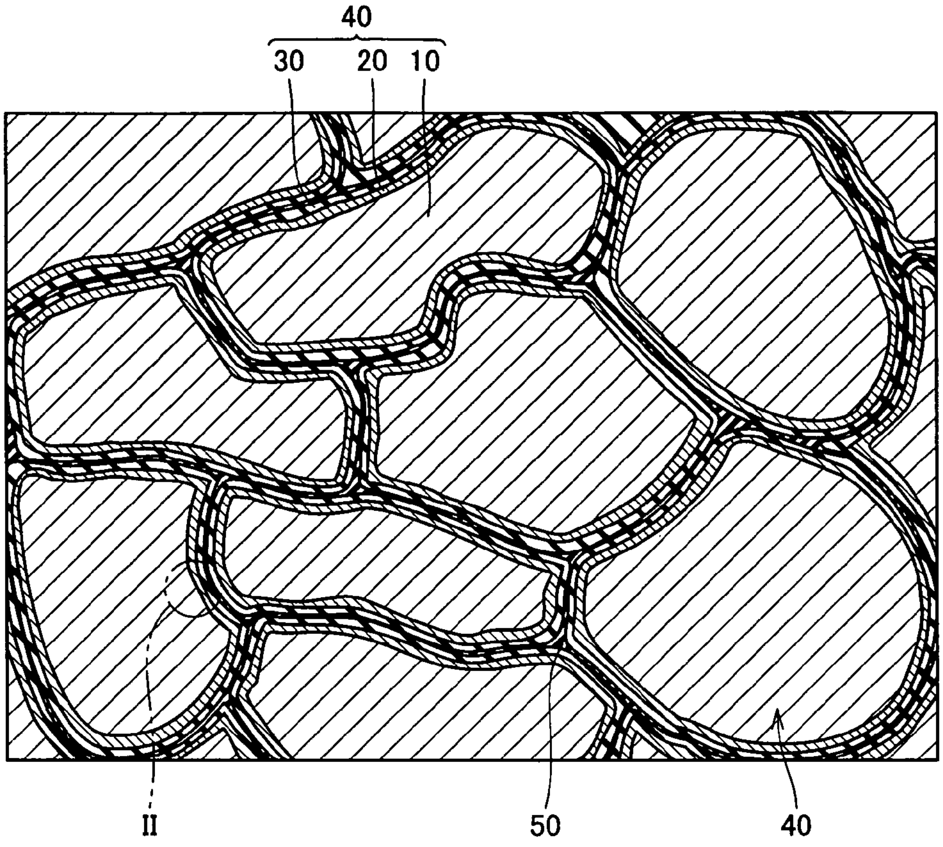
FIG. 1 is a schematic cross section of a dust core fabricated using a soft magnetic material in an embodiment of the present invention.

Referring to FIG. 1, a soft magnetic material includes a plurality of composite magnetic particles 40 each including a metal magnetic particle 10, a lower film 20 surrounding metal magnetic particle 10 and an upper film 30 surrounding lower film 20. An organic matter 50 is disposed between composite magnetic particles 40, which is formed of, for example, a polyethylene resin, a silicone resin, a polyamide resin, a polyimide resin, a polyamide imide resin, an epoxy resin, a phenolic resin, an acrylic resin and a polytetrafluoroethylene (Teflon®). A dust core is formed by composite magnetic particles 40 joined together by the engagement of protrusions and recesses on composite magnetic particles 40 or joined together by an organic matter 50.

It should be noted that organic matter 50 is not necessarily provided in the present invention, and composite magnetic particles 40 may only be joined together by the engagement of protrusions and recesses on composite magnetic particles 40.

Metal magnetic particle 10 includes iron (Fe) and is made of, for example, iron (Fe), iron (Fe)-silicon (Si) based alloys, iron (Fe)-nitrogen (N) based alloys, iron (Fe)-nickel (Ni) based alloys, iron (Fe)-carbon (C) based alloys, iron (Fe)-boron (B) based alloys, iron (Fe)-cobalt (Co) based alloys, iron (Fe)-phosphorus (P) based alloys, iron (Fe)-chromium (Cr) based alloys, iron (Fe)-nickel (Ni)-cobalt (Co) based alloys and iron (Fe)-aluminum (Al)-silicon (Si) based alloys. Metal magnetic particle 10 may be made of iron only or an iron-based alloy.

Metal magnetic particle 10 preferably has an average size of not less than 5 μm and not more than 300 μm. An average size of metal magnetic particle 10 of not less than 5 μm reduces the likelihood of metal magnetic particle 10 being oxidized, thereby providing improved magnetic properties of the dust core. An average size of metal magnetic particle 10 of not more than 300 μm avoids a decrease in compressibility of powder during the pressure-forming. Thus, the density of the molding provided by the pressure-forming can be increased.

The average size used herein means the particle size at which the sum of the masses of the particles of smaller size in a histogram of particle size measured by screening method reaches 50% of the total mass, i.e. 50% particle size D.

Lower film 20 includes a nonferrous metal such as aluminum, chromium, silicon, titanium, vanadium or nickel. Table 1 shows the affinity of nonferrous metals forming lower film 20 with carbon and oxygen as well as the affinity of iron with carbon and oxygen. Table 1 shows primary compounds produced by the reaction between these metals and carbon and oxygen as well as the heat generated during the reaction, where greater absolute values of heat generated indicate greater affinities with carbon or oxygen.

TABLE 1

| | Affinity with Carbon | | Affinity with Oxygen | |
|---|---|---|---|---|
| Metal | Primary Product | Generated Heat (@ 25° C.) (kJ/mol) | Primary Product | Generated Heat (@ 25° C.) (kJ/mol) |
| Al | $Al_4C_3$ | −3675 | $Al_2O_3$ | −1677 |
| Cr | $Cr_3C_2$ | −2721 | $Cr_2O_3$ | −1129 |
| Ni | none | — | NiO | −241 |
| Si | SiC | −1240 | $SiO_2$ | −910 |
| Ti | TiC | −5900 | TiO | −805 |
| V | VC | −1245 | $V_2O_3$ | −1219 |
| Fe | $Fe_3C$ | −1109 | FeO | −264 |

Referring to Table 1, it can be seen that the affinities of aluminum, chromium, silicon, titanium and vanadium with carbon and oxygen are greater than the affinity of iron with carbon and oxygen. While there is no carbide for nickel, its affinity with oxygen lies at the same level with the affinity of iron with oxygen.

Table 2 shows the diffusion coefficient of nonferrous metals forming lower film 20 with respect to carbon and oxygen as well as the diffusion coefficient of iron with respect to carbon and oxygen. The diffusion frequency coefficient Do and the diffusion activation energy Q in Table 2 are measured at temperatures ranging from about 500° C. to 900° C., and the diffusion coefficient D and the diffusion distance L are measured at a temperature of 600° C.

TABLE 2

| | C/Diffusion Coefficient in Metal | | | | O/Diffusion Coefficient in Metal | | | |
|---|---|---|---|---|---|---|---|---|
| Metal | Do ($m^2/s$) | Q (kJ/mol) | D (@ 600° C.) ($m^2/s$) | L (@ 600° C.) (μm) | Do ($m^2/s$) | Q (kJ/mol) | D (@ 600° C.) ($m^2/s$) | L (@ 600° C.) (μm) |
| Al | — | — | — | — | — | — | — | — |
| Cr | $9.00 \times 10^{-7}$ | 111 | $2.06 \times 10^{-13}$ | 7.7 | — | — | — | — |
| Ni | $1.20 \times 10^{-5}$ | 142 | $3.83 \times 10^{-14}$ | 3.3 | $5.80 \times 10^{-4}$ | 292 | $1.97 \times 10^{-21}$ | 0.00075 |
| Si | $1.90 \times 10^{-4}$ | 13 | $3.17 \times 10^{-5}$ | $9.5 \times 10^{4}$ | $2.10 \times 10^{-5}$ | 241 | $8.01 \times 10^{-20}$ | 0.0048 |
| Ti | $7.90 \times 10^{-8}$ | 128 | $1.74 \times 10^{-15}$ | 0.71 | $5.10 \times 10^{-7}$ | 140 | $2.15 \times 10^{-15}$ | 0.78 |
| V | $4.90 \times 10^{-7}$ | 114 | $7.41 \times 10^{-14}$ | 4.6 | $1.10 \times 10^{-5}$ | 121 | $6.34 \times 10^{-13}$ | 13 |
| Fe | $1.24 \times 10^{-5}$ | 96 | $2.24 \times 10^{-11}$ | 80 | $1.00 \times 10^{-5}$ | 111 | $2.29 \times 10^{-12}$ | 26 |

Do: Diffusion frequency term

Q: Diffusion activation energy

D (Diffusion coefficient): Do × exp(−Q/RT): R gas constant = 8.315[J/mol/K], T temperature [K]

L: Diffusion distance (the diffusion time being one hour, the interface between the diffusion source and the portion into which diffusion occurs being assumed to be spherical)

Figure 2:
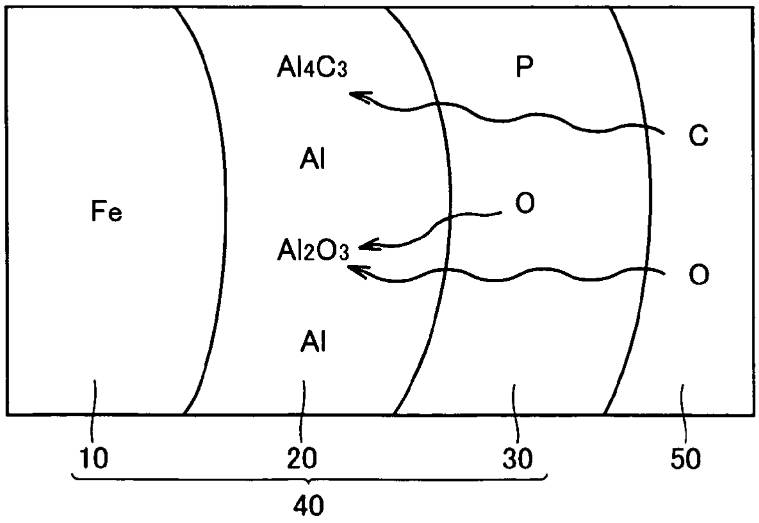
FIG. 2 is an enlarged schematic view showing the area defined by the phantom line II in FIG. 1, where the lower film is formed of a nonferrous metal with an affinity with oxygen or carbon larger than that of iron.

Referring to FIG. 2, it can be seen that the diffusion coefficients of chromium, nickel, titanium and vanadium with respect to carbon are smaller than the diffusion coefficient of iron with respect to carbon. It can also be seen that the diffusion coefficients of nickel, silicon, titanium and vanadium with respect to oxygen are smaller than the diffusion coefficient of iron with respect to oxygen. Accordingly, lower film 20 is formed of a nonferrous metal with large affinity with carbon or oxygen, a nonferrous metal with small diffusion coefficient with respect to carbon or oxygen, or a nonferrous metal with large affinity with carbon or oxygen and with small diffusion coefficient with respect to carbon and oxygen compared with iron.

Lower film 20 preferably has an average thickness of not less than 50 nm and not more than 1 μm. The average thickness used herein means the estimated thickness derived from the film composition provided by composition analysis (transmission electron microscope energy dispersive X-ray spectroscopy (TEM-EDX)) and the element weight provided by inductively coupled plasma-mass spectrometry (ICP-MS), after which the film is observed directly on a TEM picture to confirm the order of the derived estimated thickness.

Upper film 30 includes oxygen or carbon and is formed of a material that is at least electrically insulating, such as a phosphorus compound, a silicon compound, an aluminum compound, a zirconium compound and a titanium compound. These materials include iron phosphate containing phosphorus and iron as well as manganese phosphate, zinc phosphate, calcium phosphate, aluminum phosphate, silicon oxide, titanium oxide, aluminum oxide or zirconium oxide. Organic metal compounds such as a silicone resin may also be used. Upper film 30 preferably has an average thickness of not less than 10 nm and not more than 1 μm. The average thickness used herein is determined in the same way as that described above.

Upper film 30 functions as an insulator between metal magnetic particles 10. Covering metal magnetic particle 10 with upper film 30, increased electric resistivity ρ of the dust core can be achieved. This minimizes the eddy current between metal magnetic particles 10 and thereby reducing the iron loss of the dust core due to eddy current loss.

A soft magnetic material in an embodiment of the present invention includes a plurality of composite magnetic particles 40. Each of composite magnetic particles 40 includes: a metal magnetic particle 10 including iron; a lower film 20 surrounding metal magnetic particle 10 and including a nonferrous metal; and an insulating upper film 30 surrounding lower film 20 and including at least one of oxygen and carbon. The nonferrous metal has an affinity with the at least one of oxygen and carbon included in upper film 30 that is greater than such affinity of iron. The nonferrous metal has a diffusion coefficient with respect to the at least one of oxygen and carbon included in upper film 30 that is smaller than such diffusion coefficient of iron.

A method of manufacturing a dust core as shown in FIG. 1 will now be described. A lower film 20 is first formed on the surface of a metal magnetic particle 10, and an upper film 30 is formed on the surface of lower film 20 to fabricate a composite magnetic particle 40. Composite magnetic particle 40, together with an organic matter 50, is introduced into a mold and undergoes pressure-forming at a pressure ranging from 700 MPa to 1 500 MPa, for example. In this way, composite magnetic particle 40 is compressed to provide a molding. Pressure-forming may be performed in air, although it is preferably performed in an inert gas atmosphere or in an atmosphere at reduced pressure to minimize the oxidation of composite magnetic particle 40 from oxygen in the air.

Here, organic matter 50 is located between adjacent composite magnetic particles 40 and prevents upper films 30 provided on their respective composite magnetic particles 40 from rubbing against each other. Thus, upper film 30 is not damaged during the pressure-forming.

The molding provided by the pressure-forming is then heat-treated at a temperature of not less than 500° C. and not more than 900° C. in order to remove distortions or dislocations within the molding. During the heat treatment, lower film 20 formed between metal magnetic particle 10 and upper film 30 acts to prevent oxygen and carbon included in upper film 30 or organic matter 50 from diffusing into metal magnetic particle 10. In this regard, description will be made separately of a lower film 20 formed of a material including a nonferrous metal with large affinity with oxygen or carbon and of a lower film 20 formed of a material including a nonferrous metal with small diffusion coefficient with respect to oxygen or carbon compared with iron.

Referring to FIG. 2, the drawing assumes that lower film 20 is formed of aluminum and upper film 30 is formed of a phosphate compound. Here, oxygen included in upper film 30 and organic matter 50 and carbon included in organic matter 50 diffuse to lower film 20 and toward metal magnetic particle 10 during the heat treatment of the molding. However, since lower film 20 is made of aluminum, which has an affinity with oxygen and carbon larger than that of iron, lower film 20 promotes the reaction of aluminum with oxygen and carbon, incessantly generating reaction product i.e. $Al_2O_3$ and $Al_4C_3$, which prevents oxygen and carbon from infiltrating into metal magnetic particle 10.

In addition, aluminum, chromium and silicon oxides have increased electric resistance over metal alone, such that lower film 20, in addition to upper film 30, may function as an insulator between metal magnetic particles 10 after the heat treatment. Even when some nonferrous metal exists in the form of an oxide, the gettering effect can be obtained when the amount of oxygen is not more than that of the stoichiometry composition. Thus, increased electric resistance can be achieved by the production of oxide by arranging for the lower film to be an oxide of a nonferrous metal satisfying the composition range where oxygen is less than that of the stoichiometry composition. Its examples include amorphous materials such as amorphous nonferrous metals (Al, Cr, Si)-oxygen (O), amorphous nonferrous metals (Al, Cr, Si)-phosphorus (P)-oxygen (O), and amorphous nonferrous metals (Al, Cr, Si)-boron (B)-oxygen (O).

Figure 3:
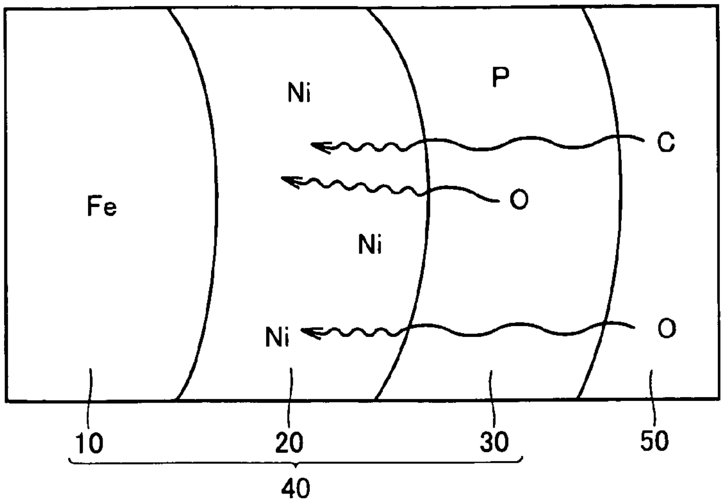
FIG. 3 is an enlarged schematic view showing the area defined by the phantom line II in FIG. 1, where the lower film is formed of a nonferrous metal with a diffusion coefficient with respect to oxygen or carbon smaller than that of iron.

Referring to FIG. 3, the drawing assumes that lower film 20 and upper film 30 are formed of nickel and a phosphate compound, respectively. Here, lower film 20 is formed of nickel which has a diffusion coefficient with respect to oxygen or carbon smaller than that of iron, which reduces the diffusion rate of oxygen and carbon in lower film 20 thereby preventing oxygen and carbon from infiltrating into metal magnetic particle 10.

Although the functions of lower film 20 have been separately described referring to FIGS. 2 and 3 for convenience, lower film 20 may be formed of a nonferrous metal with large affinity with carbon or oxygen and with small diffusion coefficient with respect to carbon or oxygen compared with iron, where lower film 20 exhibits the both functions described referring to FIGS. 2 and 3, which further ensures that oxygen and carbon are prevented from infiltrating into metal magnetic particle 10.

Figure 4:
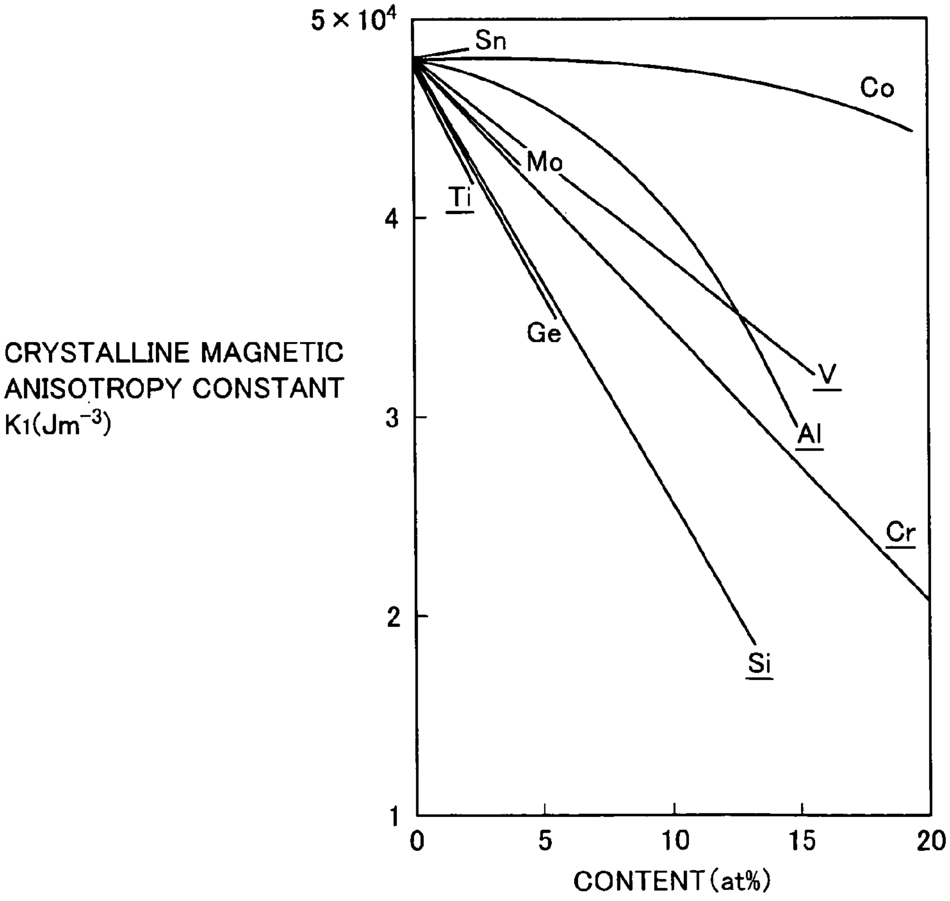
FIG. 4 is a graph showing the crystalline magnetic anisotropy of iron with which various metals form a solid solution versus the content of the metals in the solid solution.

Nonferrous metals forming lower film 20 such as aluminum, chromium, silicon, titanium, vanadium and nickel may react with iron within metal magnetic particle 10 without impairing soft magnetic properties of metal magnetic particle 10. Referring to FIG. 4, which shows the crystalline magnetic anisotropy of iron with which various metals form a solid solution versus the content of the metals in the solid solution, the crystalline magnetic anisotropy decreases as the content of aluminum or other metals increases. This demonstrates that a nonferrous metal forming lower film 20 may react with iron resulting in an alloyed metal magnetic particle 10 without impairing soft magnetic properties of metal magnetic particle 10.

After the heat treatment, the molding undergoes an appropriate treatment such as extrusion or cutting to provide a finished dust core as shown in FIG. 1.

A soft magnetic material with this configuration and a dust core fabricated using such soft magnetic material may reduce diffusion of oxygen and carbon into metal magnetic particle 10 despite heat treatment at a high temperature of not less than 500° C. Consequently, the concentration of oxygen and carbon included in upper film 30 does not dramatically decrease, such that the insulation in upper film 30 is maintained. In this way, upper film 30 ensures insulation between metal magnetic particles 10, thereby reducing the eddy current loss of the dust core.

Meanwhile, heat treatment at high temperatures achieves a satisfactory reduction of distortion within the dust core.

Moreover, since diffusion of oxygen and carbon into metal magnetic particle 10 is minimized, the concentration of impurities in metal magnetic particle 10 does not increase. Thus, the hysteresis loss of the dust core can be decreased to a satisfactory level. Thus, a dust core may be achieved that provides low iron loss in wide frequency range.

EXAMPLES

A soft magnetic material of the present invention was evaluated in the examples provided below.

An atomized pure iron powder commercially available from Hoeganaes Corporation (product name "ABC100.30", purity 99.8% or more) was first procured for metal magnetic particle 10. A lower film 20 with an average thickness of 100 nm was then formed upon metal magnetic particle 10 using vacuum deposition, plating, sol-gel method or Bonde process, and an upper film 30 with an average thickness of 100 nm was then formed using sol-gel method or Bonde process to provide powder, i.e. composite magnetic particle 40. Aluminum, chromium, nickel, silicon and amorphous aluminum-phosphorus-oxygen were used for lower film 20, while an Si glass (Si—O compound) was used for upper film 30. For comparison, a powder with only an upper film 30 without a lower film 20 was also prepared.

Organic matter 50, i.e. a polyphenylene sulfide (PPS) resin, was then added in a proportion of 0.1% by mass to the powder and the resulting mixed powder was pressure-formed at a surface pressure of 1275 MPa (=13 ton/cm$^2$) to form a molding. The molding was then heat-treated in a nitrogen atmosphere for one hour at different temperatures ranging from 300° C. to 900° C. From these steps, several dust core materials were fabricated with different types of lower film.

A coil was then wound uniformly around the fabricated dust core materials (300 turns for the primary and 20 turns for the secondary), and magnetic properties of the dust core materials were evaluated. The evaluation employed a BH tracer from RikenDenshi Co., Ltd. (ACBH-100K) and used an excitation flux density of 10 kG (kilogauss) and a measurement frequency of 1000 Hz. Table 3 shows the hysteresis loss coefficient Kh, the eddy current loss coefficient Ke and the iron loss $W_{10/1000}$ for each dust core material from the measurements.

The iron loss W is given by the sum of the hysteresis loss and the eddy current loss, and determined by the following equation based on the hysteresis loss coefficient Kh, eddy current loss coefficient Ke and frequency f:

$$W=Kh\times f+Ke\times f^2$$

The smaller the coercivity Hc i.e. the better the soft magnetic properties, the smaller the hysteresis loss coefficient Kh becomes. The better the insulation between particles and the greater the total resistance in the dust core, the smaller the eddy current loss coefficient Ke becomes. That is, the lower the coercivity and the higher the resistance, the smaller the hysteresis loss coefficient Kh and eddy current loss coefficient Ke become, which means smaller hysteresis loss and eddy current loss, resulting in a smaller iron loss. In general, the higher the temperature at which the dust core is heat-treated, the larger the amount of decrease in distortion becomes, which leads to a decrease in the coercivity Hc and hysteresis loss coefficient Kh. However, heat treatment at high temperature may deteriorate the insulation film, resulting in an unsatisfactory insulation between particles, where some magnetic particles act as one particle with large size with respect to the skin thickness. In this case, the surface current due to the skin effect is significant, and both hysteresis loss and eddy current loss dramatically increase. When derived from the iron loss in such conditions using the above equation, both the hysteresis loss coefficient Kh and eddy current loss coefficient Ke will be a significantly increased, which in the present embodiment corresponds to the case where heat treatment was conducted at temperatures above the upper limit temperatures in the tables below.

TABLE 3

| Upper Film | Si Glass/Average Thickness 100 nm | | | | | | | | | | | |
|---|---|---|---|---|---|---|---|---|---|---|---|---|
| Lower Film Heat Treatment | Al/Average Thickness 100 nm | | | Cr/Average Thickness 100 nm | | | Ni/Average Thicknes 100 nm | | | Si/Average Thickness 100 nm | | |
| Temperature | Kh | Ke | $W_{10/1000}$ | Kh | Ke | $W_{10/1000}$ | Kh | Ke | $W_{10/1000}$ | Kh | Ke | $W_{10/1000}$ |
| 300° C. | 142 | 0.036 | 178 | 150 | 0.039 | 189 | 149 | 0.034 | 183 | 144 | 0.030 | 174 |
| 400° C. | 130 | 0.034 | 164 | 133 | 0.040 | 173 | 129 | 0.036 | 165 | 131 | 0.042 | 173 |
| 500° C. | 102 | 0.045 | 147 | 106 | 0.055 | 161 | 101 | 0.041 | 142 | 93 | 0.066 | 159 |
| 600° C. | 71 | 0.050 | 121 | 80 | 0.081 | 161 | 73 | 0.052 | 125 | 77 | 0.097 | 174 |
| 700° C. | 77 | 0.163 | 240 | 88 | 0.226 | 314 | 68 | 0.069 | 137 | 103 | 0.356 | 459 |
| 800° C. | 95 | 0.254 | 349 | 120 | 0.369 | 489 | 71 | 0.088 | 159 | 169 | 0.854 | 1023 |
| 900° C. | 133 | 0.460 | 593 | 169 | 0.690 | 859 | 79 | 0.142 | 221 | 229 | 1.511 | 1740 |

| Upper Film | Si Glass/Average Thickness 100 nm | | | | | |
|---|---|---|---|---|---|---|
| Lower Film Heat Treatment | Al—P—O/Average Thickness 100 nm | | | None | | |
| Temperature | Kh | Ke | $W_{10/1000}$ | Kh | Ke | $W_{10/1000}$ |
| 300° C. | 144 | 0.025 | 169 | 142 | 0.033 | 175 |
| 400° C. | 130 | 0.027 | 157 | 131 | 0.046 | 177 |
| 500° C. | 91 | 0.033 | 124 | 106 | 0.092 | 198 |
| 600° C. | 132 | 0.198 | 330 | 89 | 0.183 | 272 |
| 700° C. | 202 | 0.582 | 784 | 104 | 0.556 | 660 |
| 800° C. | 226 | 1.322 | 1548 | 136 | 1.842 | 1978 |
| 900° C. | Measurement Impossible | | | Measurement Impossible | | |

Units: Kh[mWs/kg], Ke[mWs$^2$/kg], $W_{10/1000}$[W/kg]

As can be seen from Table 3, the dust core materials without lower film 20 exhibited increased eddy current loss coefficients at the heat treatment temperatures of 400° C. and above, while the dust core materials with aluminum, chromium and nickel as lower film 20 had an upper limit temperature of 600° C. at which the eddy current loss coefficient begins to increase, and the dust core material with silicon as lower film 20 had an upper limit temperature of 500° C. The dust core material with amorphous aluminum-phosphorus-oxygen as lower film 20 had an upper limit temperature of 500° C. In this way, heat treatment at 500° C. or higher was possible and, as a result, each lower film 20 produced the lowest value of iron loss at its upper limit temperature. For each film, such value of iron loss was smaller than the lowest iron loss of the material without lower film 20, i.e. 175 W/kg.

Further, dust core materials were fabricated under the similar conditions as above with average thicknesses of lower film 20 of 500 nm and 1000 nm. However, for amorphous aluminum-phosphorus-oxygen, the fabrication was not possible due to difficulties in the formation of a film of 200 nm or more. Magnetic properties of these dust core materials were also evaluated. Tables 4 and 5 show the hysteresis loss coefficient Kh, the eddy current loss coefficient Ke and iron loss $W_{10/1000}$ for each dust core material. Table 4 shows values for a lower film 20 with an average thickness of 500 nm, while Table 5 shows values for a lower film 20 with an average thickness of 1000 nm.

TABLE 4

| Upper Film | Si Glass/Average Thickness 100 nm | | | | | | | | | | | |
|---|---|---|---|---|---|---|---|---|---|---|---|---|
| Lower Film Heat Treatment | Al/Average Thickness 500 nm | | | Cr/Average Thickness 500 nm | | | Ni/Average Thicknes 500 nm | | | Si/Average Thickness 500 nm | | |
| Temperature | Kh | Ke | $W_{10/1000}$ | Kh | Ke | $W_{10/1000}$ | Kh | Ke | $W_{10/1000}$ | Kh | Ke | $W_{10/1000}$ |
| 300° C. | 148 | 0.042 | 190 | 150 | 0.038 | 188 | 153 | 0.030 | 183 | 151 | 0.029 | 180 |
| 400° C. | 144 | 0.044 | 188 | 139 | 0.037 | 176 | 135 | 0.031 | 166 | 136 | 0.033 | 169 |
| 500° C. | 111 | 0.041 | 152 | 108 | 0.036 | 144 | 108 | 0.036 | 144 | 98 | 0.036 | 134 |
| 600° C. | 80 | 0.052 | 132 | 91 | 0.052 | 143 | 79 | 0.044 | 123 | 69 | 0.052 | 121 |
| 700° C. | 65 | 0.077 | 142 | 73 | 0.071 | 144 | 73 | 0.066 | 139 | 86 | 0.089 | 175 |
| 800° C. | 88 | 0.228 | 316 | 85 | 0.187 | 272 | 69 | 0.079 | 148 | 110 | 0.356 | 466 |
| 900° C. | 169 | 0.662 | 831 | 137 | 0.594 | 731 | 74 | 0.120 | 194 | 167 | 0.987 | 1154 |

Units: Kh[mWs/kg], Ke[$mWs^2$/kg], $W_{10/1000}$[W/kg]

TABLE 5

| Upper Film | Si Glass/Average Thickness 100 nm | | | | | | | | | | | |
|---|---|---|---|---|---|---|---|---|---|---|---|---|
| Lower Film Heat Treatment | Al/Average Thickness 1000 nm | | | Cr/Average Thickness 1000 nm | | | Ni/Average Thicknes 1000 nm | | | Si/Average Thickness 1000 nm | | |
| Temperature | Kh | Ke | $W_{10/1000}$ | Kh | Ke | $W_{10/1000}$ | Kh | Ke | $W_{10/1000}$ | Kh | Ke | $W_{10/1000}$ |
| 300° C. | 165 | 0.052 | 217 | 170 | 0.035 | 205 | 168 | 0.031 | 199 | 158 | 0.025 | 183 |
| 400° C. | 150 | 0.055 | 205 | 156 | 0.034 | 190 | 153 | 0.033 | 186 | 152 | 0.028 | 180 |
| 500° C. | 122 | 0.056 | 178 | 123 | 0.031 | 154 | 129 | 0.035 | 164 | 113 | 0.030 | 143 |
| 600° C. | 88 | 0.049 | 137 | 92 | 0.044 | 136 | 100 | 0.039 | 139 | 71 | 0.042 | 113 |
| 700° C. | 73 | 0.062 | 135 | 76 | 0.052 | 128 | 82 | 0.044 | 126 | 80 | 0.089 | 169 |
| 800° C. | 84 | 0.099 | 183 | 68 | 0.061 | 129 | 73 | 0.053 | 126 | 106 | 0.166 | 272 |
| 900° C. | 106 | 0.235 | 341 | 70 | 0.097 | 167 | 70 | 0.089 | 159 | 195 | 0.558 | 753 |

Units: Kh[mWs/kg], Ke[$mWs^2$/kg], $W_{10/1000}$[W/kg]

Referring to Table 4, the upper limit temperature at which the eddy current loss coefficient begins to increase was 600° C. for each dust core material with lower film 20. Referring to Table 5, the upper limit temperature for the dust core materials with aluminum and chromium as lower film 20 was 700° C., the upper limit temperature for the dust core material with nickel as lower film 20 was 800° C., and the upper limit temperature for the dust core material with silicon as lower film 20 was 600° C. By increasing the average thickness of lower film 20, it was possible to reduce the iron loss $W_{10/1000}$ to the range from 110 W/kg to 120 W/kg.

It should be understood that the disclosed embodiments and examples above are, in all respects, by way of illustration only and are not by way of limitation. The scope of the present invention is set forth by the claims rather than the above description and is intended to cover all the modifications within a spirit and scope equivalent to those of the claims.

Industrial Applicability

The present invention is applicable in manufacturing motor cores, electromagnetic valves, reactors or other electromagnetic components fabricated from pressure-formed soft magnetic powder, for example.

The invention claimed is:

1. A soft magnetic material, comprising:

a plurality of composite magnetic particles, each of said plurality of composite magnetic particles having: a metal magnetic particle including iron; a lower film surrounding a surface of said metal magnetic particle and being formed of an oxide of a nonferrous metal satisfying a composition range where the amount of oxygen is less than the amount of oxygen of a stoichiometry composition of a compound constituted of an element of the nonferrous metal that constitutes the lower film, and oxygen; and an insulating upper film surrounding a surface of said lower film and including oxygen, wherein said nonferrous metal includes at least one amorphous metal selected from the group consisting of aluminum, chromium, and silicon, an absolute value of heat generated when a primary compound is produced by a reaction between oxygen and said at least one selected from the group consisting of aluminum, chromium, and silicon, is greater than an absolute value of heat generated when a primary compound is produced by a reaction between iron and oxygen, and said upper film includes at least one selected from the group consisting of a phosphorus compound, a zirconium compound, and a titanium compound.

2. The soft magnetic material according to claim 1, wherein said lower film has an average thickness of not less than 50 nm and not more than 1 μm.

3. The soft magnetic material according to claim 1, wherein said upper film has an average thickness of not less than 10 nm and not more than 1 μm.

4. A dust core fabricated using the soft magnetic material according to claim 1.

5. The dust core according to claim 4, further comprising an organic matter disposed between said plurality of composite magnetic particles to join said plurality of composite magnetic particles together and including at least one selected from the group consisting of a polyethylene resin, a silicone resin, a polyamide resin, a polyimide resin, a polyamide imide resin, an epoxy resin, a phenolic resin, an acrylic resin and a polytetrafluoroethylene.

6. A method of manufacturing the dust core according to claim 4, comprising the steps of:

by pressure-forming said plurality of composite magnetic particles, forming a molding; and heat-treating said molding at a temperature of not less than 500° C.

* * * * *